United States Patent
Davenport, III

(10) Patent No.: US 9,554,519 B2
(45) Date of Patent: Jan. 31, 2017

(54) AGRICULTURAL HARVESTER CONCAVE ADJUSTMENT SYSTEM AND METHOD

(71) Applicant: CNH Industrial America LLC, New Holland, PA (US)

(72) Inventor: Raymond Samuel Davenport, III, Elverson, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/701,252

(22) Filed: Apr. 30, 2015

(65) Prior Publication Data

US 2016/0316631 A1 Nov. 3, 2016

(51) Int. Cl.
*A01F 12/28* (2006.01)
*A01F 7/02* (2006.01)

(52) U.S. Cl.
CPC *A01F 12/28* (2013.01); *A01F 7/02* (2013.01)

(58) Field of Classification Search
CPC ......... A01F 12/28; A01F 12/26; A01F 12/181
USPC ......................................................... 56/109
See application file for complete search history.

(56) References Cited

U.S. PATENT DOCUMENTS

| | | | |
|---|---|---|---|
| 2,053,148 A | 9/1936 | James | |
| 3,631,862 A | 1/1972 | Rowland-Hill et al. | |
| 4,330,000 A | 5/1982 | Peiler | |
| 4,993,991 A | 2/1991 | Yarmashev et al. | |
| 5,489,239 A * | 2/1996 | Matousek | A01F 12/28 460/109 |
| 5,743,795 A | 4/1998 | Kersting | |
| 6,358,142 B1 * | 3/2002 | Imel | A01F 12/28 460/107 |
| 6,758,745 B2 * | 7/2004 | Van Der Haegen | A01F 12/24 460/104 |
| 7,059,961 B2 * | 6/2006 | Schenk | A01D 75/182 460/109 |
| 7,118,475 B2 * | 10/2006 | Schenk | A01F 12/28 460/109 |
| 7,226,355 B2 | 6/2007 | Schenk | |
| 7,393,274 B2 | 7/2008 | Voss et al. | |
| 7,803,040 B1 | 9/2010 | Flickinger et al. | |
| 8,133,101 B2 | 3/2012 | Regier et al. | |

FOREIGN PATENT DOCUMENTS

FR 2871339 A1 12/2005

* cited by examiner

*Primary Examiner* — Árpád Fábián-Kovács
(74) *Attorney, Agent, or Firm* — Patrick M. Sheldrake

(57) ABSTRACT

An agricultural harvesting machine including a chassis, and a threshing section carried by the chassis. The threshing section includes a rotor, a plurality of frame assemblies adjustably positioned proximate to the rotor, a plurality of concaves and an adjustment mechanism. Each concave is carried by a corresponding frame assembly. The adjustment mechanism is coupled to the frame assemblies. The plurality of frame assemblies are X frame assemblies, with X being 2 or larger. The adjustment mechanism has at least one actuator, with there being Y actuators, with Y being 1 or larger. The adjustment mechanism is configured to adjust each of the X frame assemblies to different positions with Y actuators, where Y is less than X.

20 Claims, 4 Drawing Sheets

AGRICULTURAL HARVESTER CONCAVE ADJUSTMENT SYSTEM AND METHOD

BACKGROUND OF THE INVENTION

1. Field of the Invention

The present invention relates to agricultural harvesters such as combines, and, more particularly, to an adjustment system for a concave with a minimum of actuators used in such combines.

2. Description of the Related Art

An agricultural harvester known as a "combine" is historically termed such because it combines multiple harvesting functions with a single harvesting unit, such as picking, threshing, separating and cleaning A combine includes a header which removes the crop from a field, and a feeder housing which transports the crop matter into a threshing rotor. The threshing rotor rotates within a perforated housing, which may be in the form of adjustable concaves and performs a threshing operation on the crop to remove the grain. Once the grain is threshed it falls through perforations in the concaves onto a grain pan. From the grain pan the grain is cleaned using a cleaning system, and is then transported to a grain tank onboard the combine. A cleaning fan blows air through the sieves to discharge chaff and other debris toward the rear of the combine. Non-grain crop material such as straw from the threshing section proceeds through a residue system, which may utilize a straw chopper to process the non-grain material and direct it out the rear of the combine. When the grain tank becomes full, the combine is positioned adjacent a vehicle into which the grain is to be unloaded, such as a semi-trailer, gravity box, straight truck, or the like; and an unloading system on the combine is actuated to transfer the grain into the vehicle.

More particularly, a rotary threshing or separating system includes one or more rotors which can extend axially (front to rear) or transversely within the body of the combine, and which are partially or fully surrounded by a perforated concave. The crop material is threshed and separated by the rotation of the rotor within the concave. Coarser non-grain crop material such as stalks and leaves are transported to the rear of the combine and discharged back to the field. The separated grain, together with some finer non-grain crop material such as chaff, dust, straw, and other crop residue are discharged through the concaves and fall onto a grain pan where they are transported to a cleaning system. Alternatively, the grain and finer non-grain crop material may also fall directly onto the cleaning system itself.

A cleaning system further separates the grain from non-grain crop material, and typically includes a fan directing an airflow stream upwardly and rearwardly through vertically arranged sieves which oscillate in a fore and aft manner. The airflow stream lifts and carries the lighter non-grain crop material towards the rear end of the combine for discharge to the field. Clean grain, being heavier, and larger pieces of non-grain crop material, which are not carried away by the airflow stream, fall onto a surface of an upper sieve (also known as a chaffer sieve) where some or all of the clean grain passes through to a lower sieve (also known as a cleaning sieve). Grain and non-grain crop material remaining on the upper and lower sieves are physically separated by the reciprocating action of the sieves as the material moves rearwardly. Any grain and/or non-grain crop material remaining on the top surface of the upper sieve are discharged at the rear of the combine. Grain falling through the lower sieve lands on a bottom pan of the cleaning system, where it is conveyed forwardly toward a clean grain auger. The clean grain auger conveys the grain to a grain tank for temporary storage.

The concaves of the combine need to be adjusted to be in an optimized position depending on crop type and variations encountered in the harvesting of the crop, such adjustments are difficult to accomplish.

What is needed in the art is a concave adjustment system that can meet the demands of grain harvesting variations.

SUMMARY OF THE INVENTION

The present invention provides a method and apparatus to adjust a concave in a threshing section of an agricultural harvester.

The invention in one form is directed to an agricultural harvesting machine including a chassis, and a threshing section carried by the chassis. The threshing section includes a rotor, a plurality of frame assemblies adjustably positioned proximate to the rotor, a plurality of concaves and an adjustment mechanism. Each concave is carried by a corresponding frame assembly. The adjustment mechanism is coupled to the frame assemblies. The plurality of frame assemblies are X frame assemblies, with X being 2 or larger. The adjustment mechanism has at least one actuator, with there being Y actuators, with Y being 1 or larger. The adjustment mechanism is configured to adjust each of the X frame assemblies to different positions with Y actuators, where Y is less than X.

The invention in another form is directed to a threshing section for an agricultural harvester that includes a rotor, a plurality of frame assemblies adjustably positioned proximate to the rotor, a plurality of concaves and an adjustment mechanism. Each concave is carried by a corresponding frame assembly. The adjustment mechanism is coupled to the frame assemblies. The plurality of frame assemblies are X frame assemblies, with X being 2 or larger. The adjustment mechanism has at least one actuator, with there being Y actuators, with Y being 1 or larger. The adjustment mechanism is configured to adjust each of the X frame assemblies to different positions with Y actuators, where Y is less than X.

The invention in yet another form is directed to a method of adjusting a concave in an agricultural harvester. The method having the steps of: positioning a plurality of frame assemblies proximate to a rotor; carrying a concave in each frame assembly; and actuating an adjustment mechanism coupled to the frame assemblies. The plurality of frame assemblies being X frame assemblies, with X being 2 or larger. The adjustment mechanism has at least one actuator, with there being Y actuators, with Y being 1 or larger. The adjustment mechanism is configured to adjust each of the X frame assemblies to different positions with Y actuators, where Y is less than X.

The present invention advantageously provides an adjustable concave assembly using a minimum number of actuators.

Another advantage of the present invention is that it can be implemented to vary the adjustments of the concaves so that the concaves are differing distances from the rotor.

Yet another advantage of the present invention is that the one adjustment member provides a bias to all of the concaves in a simultaneous fashion.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates an embodiment of the invention, in one form, and such exemplification is not to be construed as limiting the scope of the invention in any manner.

DETAILED DESCRIPTION OF THE INVENTION

The terms "grain", "straw" and "tailings" are used principally throughout this specification for convenience but it is to be understood that these terms are not intended to be limiting. Thus "grain" refers to that part of the crop material which is threshed and separated from the discardable part of the crop material, which is referred to as non-grain crop material, MOG or straw. Incompletely threshed crop material is referred to as "tailings". Also the terms "forward", "rearward", "left" and "right", when used in connection with the agricultural harvester and/or components thereof are usually determined with reference to the direction of forward operative travel of the harvester, but again, they should not be construed as limiting. The terms "longitudinal" and "transverse" are determined with reference to the fore-and-aft direction of the agricultural harvester and are equally not to be construed as limiting.

Figure 1:
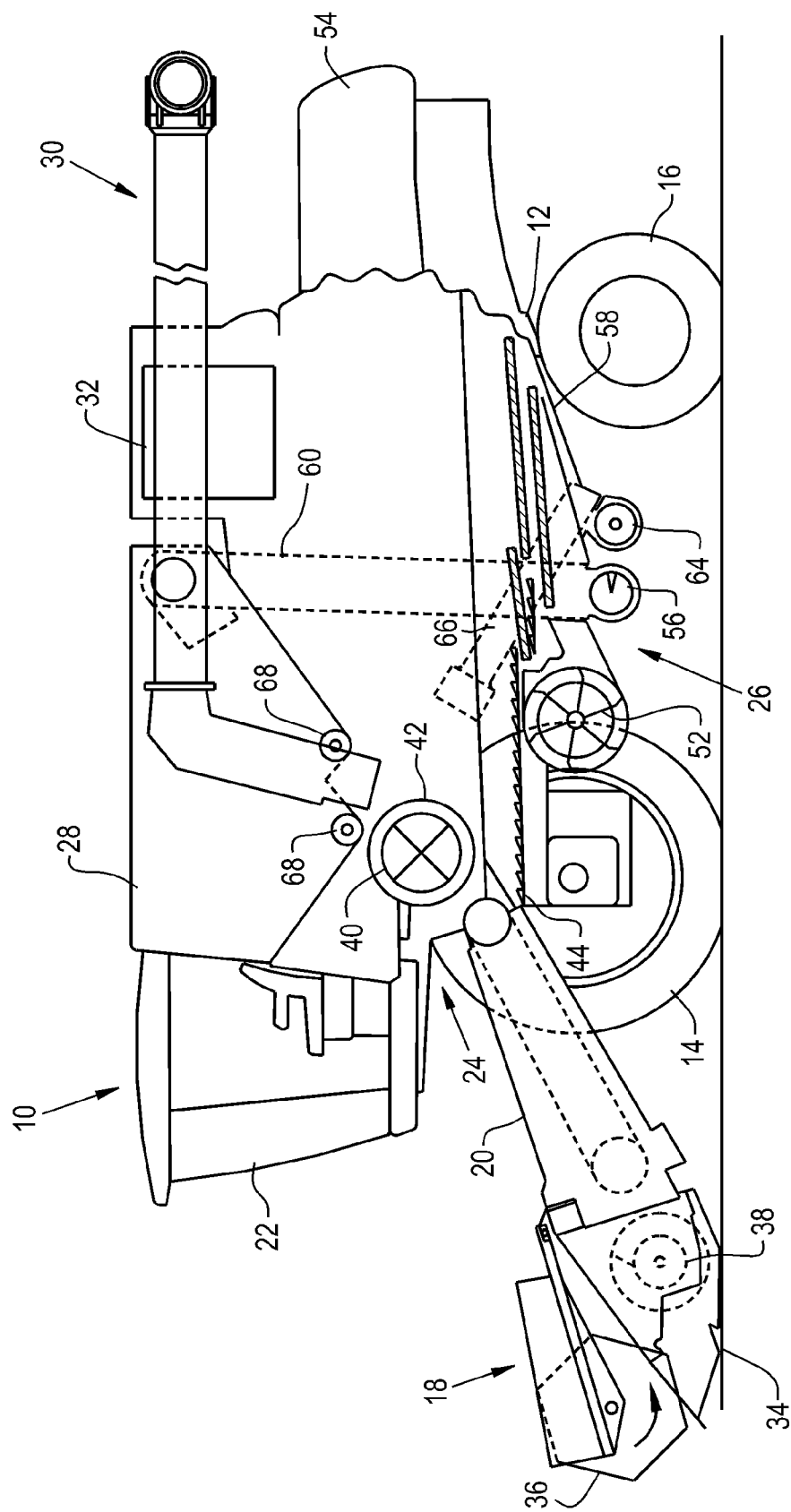
FIG. 1 is a side view of an embodiment of an agricultural harvester in the form of a combine which includes an embodiment of a concave adjustment system of the present invention.

Referring now to the drawings, and more particularly to FIG. 1, there is shown an agricultural harvester in the form of a combine 10, which generally includes a chassis 12, ground engaging wheels 14 and 16, a header 18, a feeder housing 20, an operator cab 22, a threshing system 24, a cleaning system 26, a grain tank 28, and an unloading auger 30.

The front wheels 14 are larger flotation type wheels, and the rear wheels 16 are smaller steerable wheels. Motive force is selectively applied to the front wheels 14 through a power plant in the form of a diesel engine 32 and a transmission (not shown). Although the combine 10 is shown as including wheels, is also to be understood that the combine 10 may include tracks, such as full tracks or half tracks.

The header 18 is mounted to the front of the combine 10 and includes a cutter bar 34 for severing crops from a field during forward motion of the combine 10. A rotatable reel 36 feeds the crop into the header 18, and a double auger 38 feeds the severed crop laterally inwardly from each side toward the feeder housing 20. The feeder housing 20 conveys the cut crop to the threshing system 24, and is selectively vertically movable using appropriate actuators, such as hydraulic cylinders (not shown).

The threshing and separating system 24 is of an axial-flow type, and generally includes a rotor 40 at least partially enclosed by and rotatable within a corresponding perforated concave 42. The cut crops are threshed and separated by the rotation of the rotor 40 within the concave 42, and larger elements, such as stalks, leaves and the like are discharged from the rear of the combine 10. Smaller elements of crop material including grain and non-grain crop material, including particles lighter than grain, such as chaff, dust and straw, are discharged through perforations of the concave 42. Rotor 40 is shown in a representative sense in that rotor 40 may be more than one rotor 40 and they may be oriented generally in line with the direction of travel of combine 10.

Grain which has been separated by the threshing and separating assembly 24 falls onto a grain pan 44 and is conveyed toward the cleaning system 26. The cleaning system 26 may include an optional pre-cleaning sieve, an upper sieve (also known as a chaffer sieve), a lower sieve (also known as a cleaning sieve), and a cleaning fan 52. Grain on the sieves is subjected to a cleaning action by fan 52 which provides an airflow through the sieves to remove chaff and other impurities such as dust from the grain by making this material airborne for discharge from a straw hood 54 of the combine 10. The grain pan 44 and a pre-cleaning sieve oscillate in a fore-to-aft manner to transport the grain and finer non-grain crop material to the upper surface of an upper sieve.

Clean grain falls to a clean grain auger 56 positioned crosswise below and in front of a lower sieve. The clean grain auger 56 receives clean grain from each sieve and from a bottom pan 58 of the cleaning system 26. The clean grain auger 56 conveys the clean grain laterally to a generally vertically arranged grain elevator 60 for transport to the grain tank 28. Tailings from the cleaning system 26 fall to a tailings auger trough. The tailings are transported via a tailings auger 64 and the return auger 66 to the upstream end of the cleaning system 26 for repeated cleaning action. A pair of grain tank augers 68 at the bottom of the grain tank 28 convey the clean grain laterally within the grain tank 28 to the unloading auger 30 for discharge from the combine 10.

The non-grain crop material proceeds through a residue handling system. The residue handling system includes a chopper, counter knives, a windrow door and a residue spreader.

Figure 2:
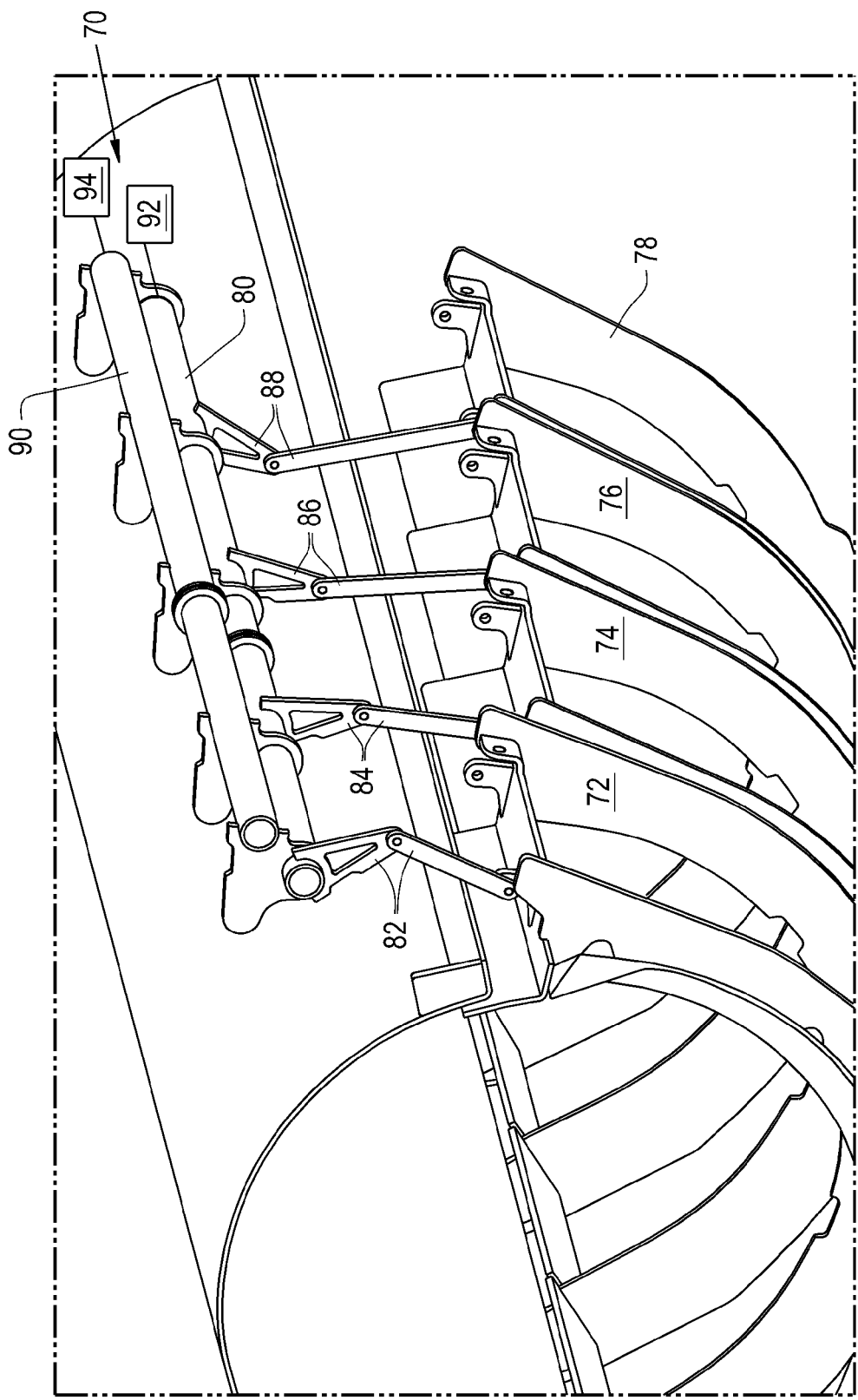
FIG. 2 is a perspective view of the concave adjustment assembly used in the combine of FIG. 1 configured to each be adjusted by way of two actuators.

Now, additionally referring to FIG. 2 there is shown a concave adjustment mechanism 70, which is connected to frame assemblies 72. 74, 76, and 78, each of which are configured to carry a concave 42, not shown here for the sake of clarity. Each rotor 40 will have a concave adjustment mechanism 70 associated therewith.

Concave adjustment mechanism 70 includes an adjustment member 80 that is coupled to frame assemblies 72. 74, 76, and 78, by way of linkages 82, 84, 86, and 88. Concave adjustment mechanism 70 also includes an adjustment member 90 that is coupled to adjustment member 80. Frame assemblies 72. 74, 76, and 78 are adjusted to differing positions as can be seen in FIG. 2, as a result of the lengths of, and angular orientation of linkages 82, 84, 86, and 88. For example, linkage 82 illustrates a shorter overall length than linkage 88, and the angular orientation of linkage 82 has a different orientation than that of linkage 88.

As adjustment member 80 rotates, the spacing of frame assemblies 72. 74, 76, and 78 relative to rotor 40 (not shown in this figure for the sake of clarity) changes. In this illustration if adjustment member 80 moves clockwise (as viewed from the left) from the illustrated position, then frame assembly 72 will lower moving its associated concave away from rotor 40 and frame assembly 78 will move upwards, toward rotor 40. Further, due to the coupling of adjustment member 90 to adjustment member 80, as adjustment member 90 rotates it provides an overall bias to thereby move frame assemblies 72. 74, 76, and 78 in a more uniform manner.

Figure 3:
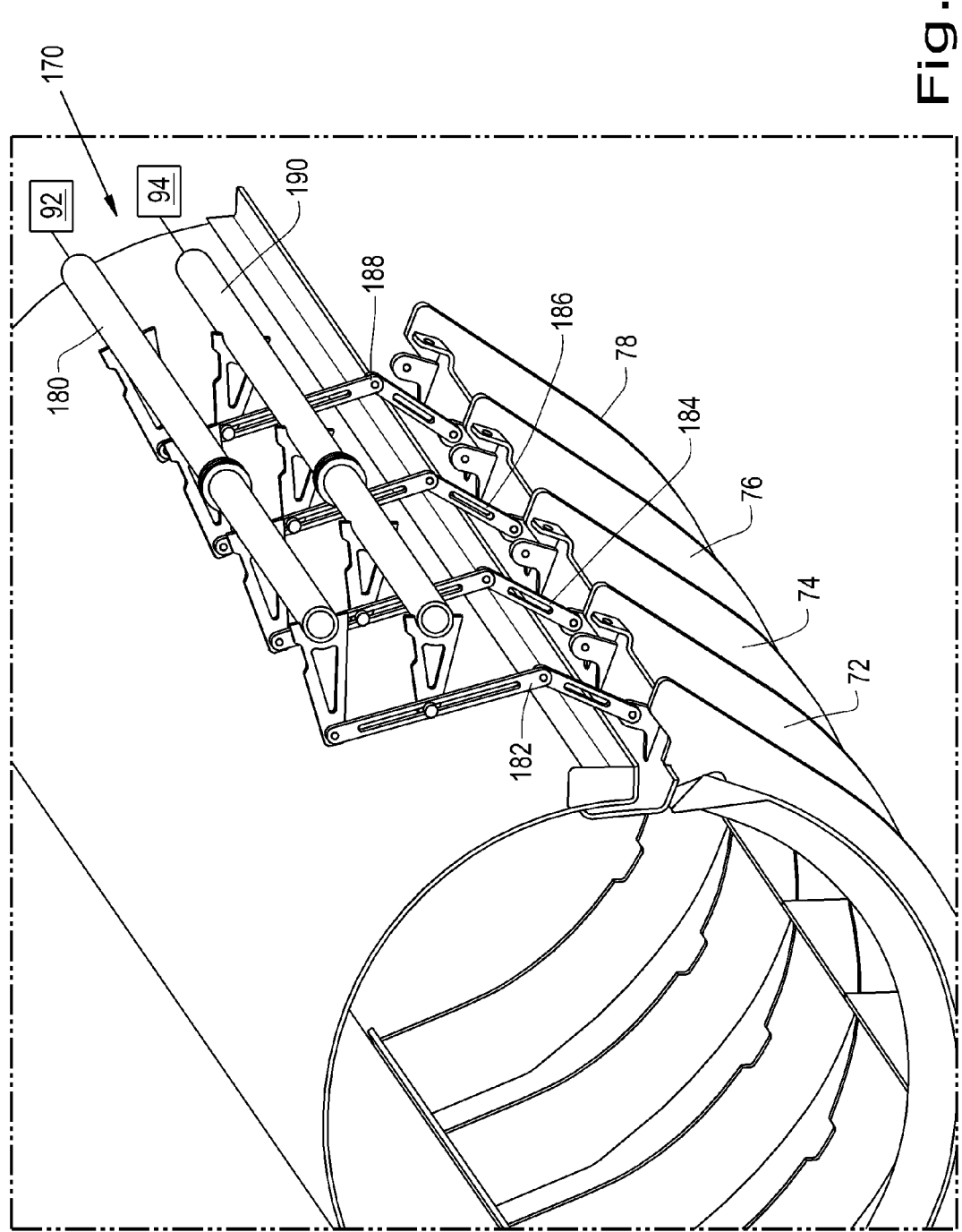
FIG. 3 is another perspective view of the concave adjustment assembly used in the combine of FIG. 1 configured in another way by way of two actuators.

Now, additionally referring to FIG. 3 there is shown a concave adjustment mechanism 170, which is somewhat similar to concave adjustment mechanism 70, previously discussed and similar items will have numbers that are increased by 100. Attributes discussed about one item will generally also apply to the similarly numbered item. Concave adjustment mechanism 170, is connected to frame assemblies 72. 74, 76, and 78, each of which are configured to carry a concave 42, not shown here for the sake of clarity. Each rotor 40 would have a concave adjustment mechanism 170 associated therewith.

Concave adjustment mechanism 170 includes an adjustment member 180 that is coupled to frame assemblies 72. 74, 76, and 78, by way of linkages 182, 184, 186, and 188. Concave adjustment mechanism 170 also includes an adjustment member 190 that is also coupled to linkages 182, 184, 186, and 188. Frame assemblies 72. 74, 76, and 78 are adjusted to differing positions, as a result of the lengths of, and angular orientation of arms 96, and their interaction with linkages 182, 184, 186, and 188. For example, FIG. 3 illustrates an angular orientation of arm 96 coupled to linkage 182 that has a different orientation than that of arm 96 that interacts with linkage 188.

As adjustment member 180 rotates, the spacing of frame assemblies 72. 74, 76, and 78 relative to rotor 40 (not shown in this figure for the sake of clarity) changes relative to the lengths of linkages 182, 184, 186 and 188. In this illustration if adjustment member 180 moves clockwise (as viewed from the left) from the illustrated position, then frame assemblies 72, 74, 76 and 78 will all raise moving its associated concave toward rotor 40. Further, due to the coupling of adjustment member 190 with adjustment member 180 by way of linkages 182, 184, 186, and 188, as adjustment member 190 rotates it will serve to vary the rate of movement of frame assemblies 72, 74, 76, and 78, as linkages 182, 184, 186, and 188 are angularly displaced.

In each of the foregoing embodiments it can be said the adjustment members 80 and 90; and 180 and 190, are respectively coupled to frame assemblies 72, 74, 76, and 78. Each adjustment member being arranged to vary the positions of frame assemblies 72, 74, 76, and 78 in differing ways so that the combination of movements of the adjustment members allows a multiple of orientations of frame assemblies 72, 74, 76, and 78. Actuators 92 and 94 are respectively coupled to adjustment members 80 and 90, and the movement may be rotational as discussed, but it is also contemplated for there to be linear movement as well.

Figure 4:
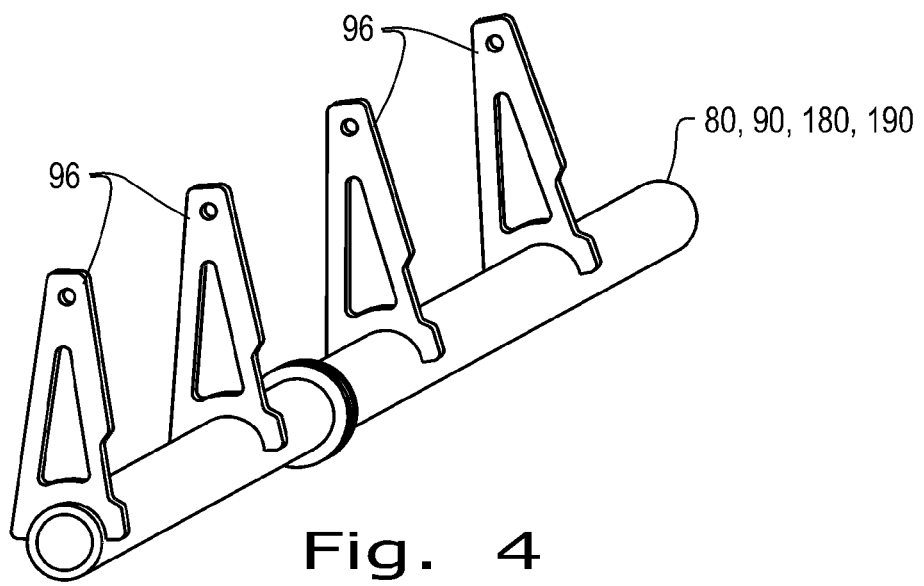
FIG. 4 is a perspective view of linkages associated with one adjustment member, such as the ones shown in FIGS. 2 and 3, of the concave adjustment assembly showing how the concaves are adjusted differently using one adjustment mechanism.
Figure 5:
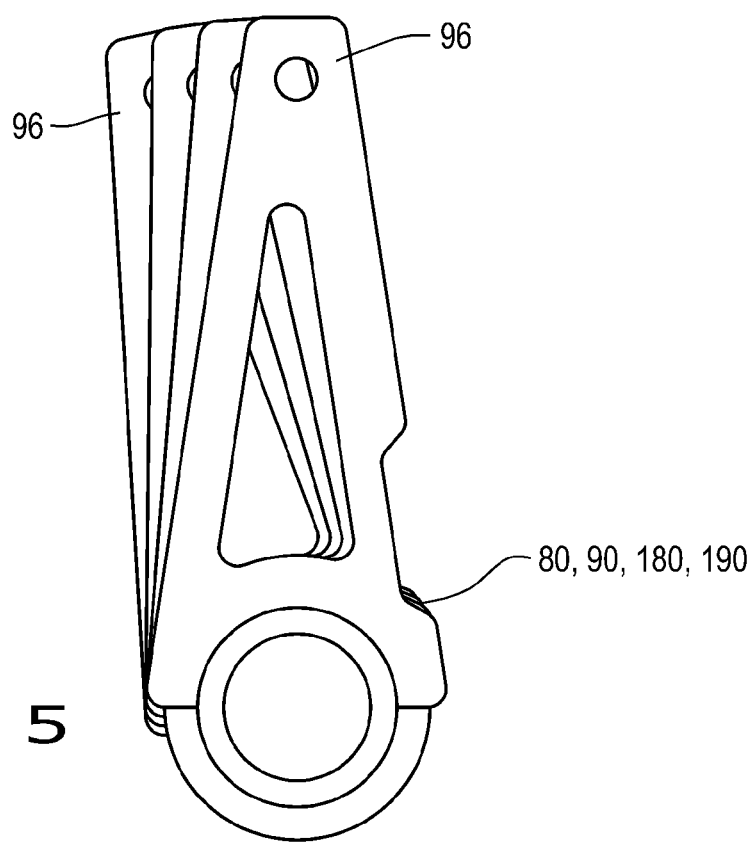
FIG. 5 is a perspective view of linkages associated with one adjustment member, such as the ones shown in FIGS. 2 and 3, of the concave adjustment assembly showing another way in which the concaves are adjusted differently using one adjustment mechanism.

Now, additionally referring to FIGS. 4 and 5, there are shown arms 96 that are associated with adjustment members 80, 90, 180 and 190, which are broadly part of the associated linkages. Arms 96 may have differing lengths, as shown in FIG. 4. Alternatively, or in addition thereto, arms 96 may have differing phase angles as shown in FIG. 5. Each of these variations allow for differing control scenarios for the movement of frame assemblies 72, 74, 76 and 78 with two actuators.

It is observed that if there are X frame assemblies that Y actuators may be used to adjust the X frame assemblies to differing positions when Y is less than X. More specifically, X may be 3 or greater when Y is 2, and even more specifically X may be 4 or more while X remains at 2. The prior art shows adjusting X frame assemblies with X actuators, but not the ability to adjust X frame assemblies to differing positions using less than X actuators.

The present invention is that multiple types of relationships can be created using 2 concave adjustment members 80 and 90. Many variations are possible and include 2 different torsion tubes or a torsion tube and a cam, an elliptical cam with a linear linkage, two elliptical cams, a stepped and linear linkage, and two linear linkages. The arms may work with a similar staggering. Length of arms or shape of cams can also be varied. One arm set could also be in-line across multiple modules so as to create a uniform motion across the modules. Endless variations are possible.

The present invention advantageously allows individually adjusting modules for 4 frame assemblies, which would otherwise be prohibitive. The current invention provides a way to produce a large number of variations from uniform to non-uniform motion among the modules while only requiring 2 adjust mechanisms for the total system. It is also contemplated to have a screen readout in the cab of a desired position for each module while the computer system determines the correct individual position of the two adjustment members 80 and 90 to approximate the desired module positions.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An agricultural harvesting machine comprising:
   a chassis;
   a threshing section carried by said chassis, said threshing section including:
      a rotor;
      a plurality of frame assemblies adjustably positioned proximate to said rotor;
      a plurality of concaves, each said concave being carried by a corresponding one of said frame assemblies; and
      an adjustment mechanism coupled to said frame assemblies, said plurality of frame assemblies being X frame assemblies, with X being 2 or larger, said adjustment mechanism having Y actuators, with Y being 1 or larger, said adjustment mechanism adjusting each of said X frame assemblies to different positions with the Y actuators, where Y is less than X.

2. The agricultural harvester of claim 1, wherein said X is at least 3 and Y is 2.

3. The agricultural harvester of claim 2, wherein said X is at least 4.

4. The agricultural harvester of claim 1, wherein said adjustment mechanism includes:

a first adjustment member adjustingly coupled to each of said plurality of frame assemblies; and a second adjustment member adjustingly coupled to said plurality of frame assemblies.

5. The agricultural harvester of claim 4, wherein said second adjustment member is configured to alter a position of said first adjustment member to thereby adjust said plurality of frame assemblies.

6. The agricultural harvester of claim 4, further comprising a plurality of linkages, said first adjustment member being coupled to each of said plurality of frame assemblies by way of said linkages, said second adjustment member being configured to also interact with said linkages to thereby adjust said plurality of frame assemblies.

7. The agricultural harvester of claim 4, wherein said at least one actuator includes a first actuator and a second actuator, said first actuator being coupled to said first adjustment member, said second actuator being coupled to said second adjustment member.

8. A threshing section of an agricultural harvester, the threshing section including:

a rotor;

a plurality of frame assemblies adjustably positioned proximate to said rotor;

a plurality of concaves, each said concave being carried by a corresponding one of said frame assemblies; and an adjustment mechanism coupled to said frame assemblies, said plurality of frame assemblies being X frame assemblies, with X being 2 or larger, said adjustment mechanism having Y actuators, with Y being 1 or larger, said adjustment mechanism adjusting each of said X frame assemblies to different positions with the Y actuators, where Y is less than X.

9. The threshing section of claim 8, wherein said X is at least 3 and Y is 2.

10. The threshing section of claim 9, wherein said X is at least 4.

11. The threshing section of claim 8, wherein said adjustment mechanism includes:

a first adjustment member adjustingly coupled to each of said plurality of frame assemblies; and a second adjustment member adjustingly coupled to said plurality of frame assemblies.

12. The threshing section of claim 11, wherein said second adjustment member is configured to alter a position of said first adjustment member to thereby adjust said plurality of frame assemblies.

13. The threshing section of claim 11, further comprising a plurality of linkages, said first adjustment member being coupled to each of said plurality of frame assemblies by way of said linkages, said second adjustment member being configured to also interact with said linkages to thereby adjust said plurality of frame assemblies.

14. The threshing section of claim 13, wherein said at least one actuator includes a first actuator and a second actuator, said first actuator being coupled to said first adjustment member, said second actuator being coupled to said second adjustment member.

15. A method of adjusting a concave in an agricultural harvester, the method having the steps of:

positioning a plurality of frame assemblies proximate to a rotor;

carrying a concave in each said frame assembly; and actuating an adjustment mechanism coupled to said frame assemblies, said plurality of frame assemblies being X frame assemblies, with X being 2 or larger, said adjustment mechanism having Y actuators, with Y being 1 or larger, said adjustment mechanism adjusting each of said X frame assemblies to different positions with the Y actuators, where Y is less than X.

16. The method of claim 15, wherein said X is at least 3 and Y is 2.

17. The method of claim 16, wherein said X is at least 4.

18. The method of claim 15, wherein said adjustment mechanism includes:

a first adjustment member adjustingly coupled to each of said plurality of frame assemblies; and a second adjustment member adjustingly coupled to said plurality of frame assemblies.

19. The method of claim 18, wherein said second adjustment member is configured to alter a position of said first adjustment member to thereby adjust said plurality of frame assemblies.

20. The method of claim 18, further comprising a plurality of linkages, said first adjustment member being coupled to each of said plurality of frame assemblies by way of said linkages, said second adjustment member being configured to also interact with said linkages to thereby adjust said plurality of frame assemblies.

* * * * *